United States Patent
Fisher et al.

(10) Patent No.: US 6,832,025 B2
(45) Date of Patent: Dec. 14, 2004

(54) FIBER BRAGG GRATING FABRICATION METHOD

(75) Inventors: Norman Fisher, Torquay (GB); Julian Jones, Maidstone (GB)

(73) Assignee: JDS Uniphase Corporation, San Jose, CA (US)

( * ) Notice: Subject to any disclaimer, the term of this patent is extended or adjusted under 35 U.S.C. 154(b) by 167 days.

(21) Appl. No.: 10/183,681

(22) Filed: Jun. 28, 2002

(65) Prior Publication Data

US 2003/0002795 A1 Jan. 2, 2003

Related U.S. Application Data

(60) Provisional application No. 60/301,811, filed on Jul. 2, 2001.

(51) Int. Cl.$^7$ .............................................. G02B 6/124
(52) U.S. Cl. ............................ 385/37; 385/28; 385/27; 385/39
(58) Field of Search ............................ 385/37, 10, 27, 385/28, 39

(56) References Cited

U.S. PATENT DOCUMENTS

| | | | | |
|---|---|---|---|---|
| 4,676,594 A | * | 6/1987 | Presby | 385/123 |
| 5,411,566 A | * | 5/1995 | Poole et al. | 65/402 |
| 5,708,740 A | | 1/1998 | Cullen | 385/39 |
| 5,764,829 A | | 6/1998 | Judkins et al. | 385/37 |
| 5,818,987 A | * | 10/1998 | Bakhti et al. | 385/28 |
| 5,949,934 A | * | 9/1999 | Shima et al. | 385/37 |
| 6,058,226 A | * | 5/2000 | Starodubov | 385/12 |
| 6,130,974 A | * | 10/2000 | Rivoallan | 385/37 |
| 6,181,840 B1 | * | 1/2001 | Huang et al. | 385/10 |
| 6,317,538 B1 | * | 11/2001 | Shigehara et al. | 385/37 |
| 6,408,118 B1 | * | 6/2002 | Ahuja et al. | 385/37 |
| 6,430,342 B1 | * | 8/2002 | Kim et al. | 385/37 |

FOREIGN PATENT DOCUMENTS

| | | |
|---|---|---|
| EP | 0 736 784 A2 | 10/1996 |
| GB | 2155621 A | 9/1985 |

OTHER PUBLICATIONS

Two–Mode Fibre Spatial–Node Converter Using Periodic Core Deformation; C.D. Poole,; Electronic Letters; Aug. 18, 1994; vol. 30; No. 17.; pp. 1437–1438.

* cited by examiner

*Primary Examiner*—John D. Lee
*Assistant Examiner*—Scott Alan Knauss
(74) *Attorney, Agent, or Firm*—Allen, Dyer, Doppelt Milbrath & Gilchrist, P.A.

(57) ABSTRACT

In an optical waveguide fabricated to provide spectral filtering by a periodic mode coupling between the core and cladding the spectral profile may be shifted in wavelength if the core or cladding is photosensitive. This is especially useful in the case of long period gratings used as gain flattening filters, as a relatively low dose of radiation, compared with that typically required to fabricate a Reflection Bragg Grating in the same fiber, provides a sufficient shift for filter tuning purposes. Subsequent thermal exposure can stabilize the filter performance over the expected temperature range, while exposure to higher temperature reverses the radiation induced shift.

10 Claims, 7 Drawing Sheets

FIBER BRAGG GRATING FABRICATION METHOD

CROSS REFERENCE TO RELATED APPLICATIONS

The present application claims priority to provisional application having Ser. No. 60/301,811 entitled "UV tuning of gain flattening filters", filed on Jul. 2, 2001 which is incorporated herein by reference

BACKGROUND OF INVENTION

The present invention relates to methods of fabricating optical waveguides for selectively filtering light according to wavelength as it propagates within the waveguide.

Optical waveguides comprise a core region having a first refractive index and surrounding cladding regions having a second, lower refractive index. In an optical fiber waveguide the core region has a circular cross section and is surrounded by a substantially thicker cladding layer. The interface between the core and the cladding is substantially planar such that transmission occurs primarily in the core-guided fundamental $HE_{11}$ (zero order) mode, thus preventing energy loss through the cladding layer. In many applications optical waveguides convey polychromatic light. Fiber Bragg Gratings (FBG) permit the selective filtering of the light according to wavelength within such optical waveguides, and among other benefits, avoid interrupting the waveguide to insert macroscopic filters. Generally speaking, Fiber Bragg gratings are periodic structures formed in optical fiber or other optical waveguides. The exact nature of the wavelength selective filtering is determined, among other factors, by length and repetitive sequence of the periodic structures. In one type of Fiber Bragg grating, known as a Bragg Reflection Grating, discrete regions of different refractive index define the periodic structure that traverse the core of the optical fiber. The length and order of these discrete regions need not repeat exactly to form a periodic structure, as the structure is selected to achieve a particular transmission value that may vary over a predetermined wavelength range. The periodic fluctuations in refractive index typically modify the transmission characteristics of the waveguide by constructive and destructive interference on the basis of wavelength, such that selected wavelengths are partially or totally transmitted or reflected. However, the FBG structure may also modify the phase, polarization or other propagation characteristics of the incident light.

The wavelengths not transmitted in a Bragg Reflective Grating are reflected by the periodic structure such that they propagate in the waveguide core in the reverse direction. The reflective grating is typically fabricated by "writing" the desired the grating structure in an optical glass whose refractive index is dependent upon the dose of ionizing radiation absorbed therein. The "writing" process being the elected exposure of the periodic regions within the optical fiber to ionizing radiation. These writing methods include a flood exposure with UV light through a patterned mask, as well as direct writing with a focused light source or other form of ionizing radiation. The resultant grating can reflect light of wavelength $\lambda_c$ provided the Bragg condition, $\lambda_c = 2n\Lambda$, is satisfied in which n is the mode refractive index and $\Lambda$ is the grating period or pitch. Accordingly the pitch of the index fluctuation along the length of the fiber is comparable to the wavelength of light to be filtered by reflection.

A second type of Fiber Bragg Grating filters selected wavelengths by coupling to a forward propagation mode in the cladding, rather than by back reflection in the core, as in a Bragg Reflection Grating. The periodic structure for mode coupling between the fiber core and cladding can be introduced by either reducing the refractive index difference between the core and cladding in selected regions, as taught in U.S. Pat. No. 5,764,829, supra, or by periodically distorting the planar interface between the core and cladding layers. The term Long Period Grating is descriptive of the longer structural periodicity relative to a Bragg Reflection Grating having the same center wavelength position. The transmission profile of a Long Period Grating is the square of the sinc function (sin x/x), having a center wavelength position according to the relationship:

$$\lambda_c = (n_c - n_{cl})\Lambda,$$

wherein $n_c$ is the core effective index and $n_{cl}$ is the nth cladding mode effective index. As this difference in index is a small number, that is usually less than $1/10^{th}$ of $n_c$ the pitch to achieve the same center wavelength, $\lambda_c$ can be an order of magnitude larger than in a Bragg Reflection Grating.

Long Period Gratings can be fabricated by selective UV exposure, for example as disclosed in U.S. Pat. No. 5,764,829, which is incorporated herein by reference. However, as the size of the periodicity is larger than for a functionally equivalent Bragg Reflection Grating they are advantageously fabricated by other methods. For example, it is disclosed in GB 2 155 621 that, by pressing an optical fiber against a ribbed surface so as to induce microbending with a particular periodicity, mode coupling can be induced at a selected wavelength between a mode guided by the core of the fiber (core mode) and one or more modes which are guided by the cladding (cladding modes), and which are attenuated relatively highly in comparison with the core mode. Such a device operates in transmission to attenuate selectively light at the wavelength at which such mode coupling occurs.

A letter by C. D. Poole et al. entitled "Two-mode spatial-mode converter using periodic core deformation", Electronics Letters Aug. 15, 1994 Vol. 30 No. 17 pp 1437-8, discloses how a mode coupling filtering effect may be achieved by an ablation method. This method creates period changes in curvature by first using a laser to ablate material from the side of the fiber at equally spaced localized intervals along its length. Subsequent heating of those regions of the optical fiber produces a similarly localized wrinkle in the core of the optical fiber due to surface-tension effects. The authors of this letter suggest that an advantage of the ablation method over the photo-induced grating method is that the perturbations achievable by photo-induced refraction index changes are limited in magnitude to inconveniently small values, whereas the ablation method can be used to write much larger perturbations.

U.S. Pat. No. 5,708,740, which is incorporated herein by reference, is similarly directed to a method of producing mode-coupling optical fiber notch filters whose periodic perturbations are comparable with those readily achievable using the ablation method, but which is distinguished from the ablation method, inter alia, in that each perturbation is created using a single stage process, such that the creation of the perturbations does not involve any deliberate off-axis deviation of the fiber core.

Fabrication errors present a practical limitation in the commercial manufacture of Long Period Gratings, in that all techniques of fabricating Fiber Bragg Gratings that function by mode coupling variations are subject to tolerance errors and deviations from multiple causes. The errors cannot generally be tested without completing the grating fabrication and measuring the actual transmission function of the grating by spectroscopic methods. As some of the errors are random, the yield of suitable product is lowered.

It is therefore a first object of the present invention to provide a method for reworking fabricated Long Period Gratings so as to correct for fabrication errors.

Another objective is to provide a method for shifting the filter characteristics of Long Period Grating without further mechanical deformation or other changes in physical dimensions.

Yet another objective is to provide a method for thermally stabilizing Long Period Grating that have modified or shifted filter characteristics obtained without mechanical deformation or other changes in physical dimensions.

SUMMARY OF INVENTION

In the present invention, the first object is achieved by fabricating a Long Period Grating by conventional methods using an optical waveguide having a core region that is photosensitive. After the Long Period Grating is formed at least a portion of the core region is exposed to ionizing radiation to modify the refractive index of the core region, and shift the profile of the wavelength dependent transmission. In the case of a photosensitive core optical medium that increases in refractive index upon UV exposure the shift of the transmission profile is to longer wavelengths.

The second objective of providing a thermally stabilizing Long Period Grating is achieved by annealing an irradiated Long Period Grating for a sufficient time, at a temperature dependent on the ultimate use temperature. Although annealing also shifts the wavelength dependence of transmission in the reverse direction as UV exposure, the steps of irradiation and annealing may be carried out in multiple sequences to adjust the filter performance and optimize the thermal stability of the filter over the anticipated operating temperature range. Alternatively, by selecting the irradiation dose to provide a greater than desired shift this reversal by annealing can be accommodated. Additionally, cycles of repetitive irradiation and annealing provide a method for post fabrication modification to meet different or changing end user requirements, as well as for tuning the filter to meet the initial targeted specification.

The above and other objects, effects, features, and advantages of the present invention will become more apparent from the following description of the embodiments thereof taken in conjunction with the accompanying drawings.

DETAILED DESCRIPTION

Figure 1A:
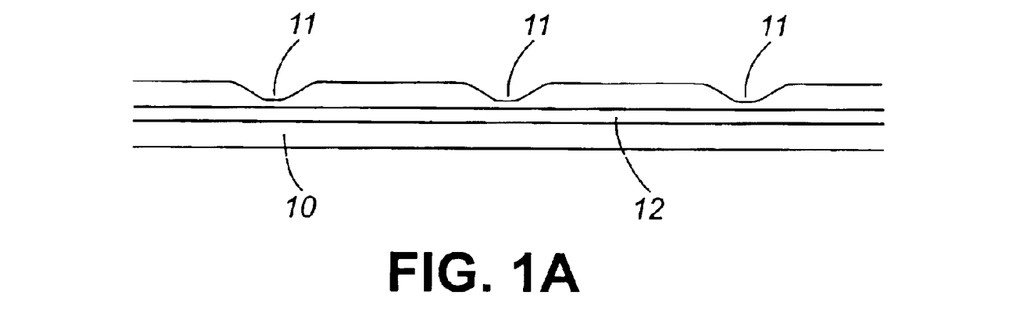
FIGS. 1(a) and 1(b) depict successive stages in a prior art method of inducing core/cladding mode coupling in a Long Period Grating by partial ablation of the cladding layer, with FIG. 1(b) showing the final structure and the interface between the core and cladding layers.
Figure 1B:
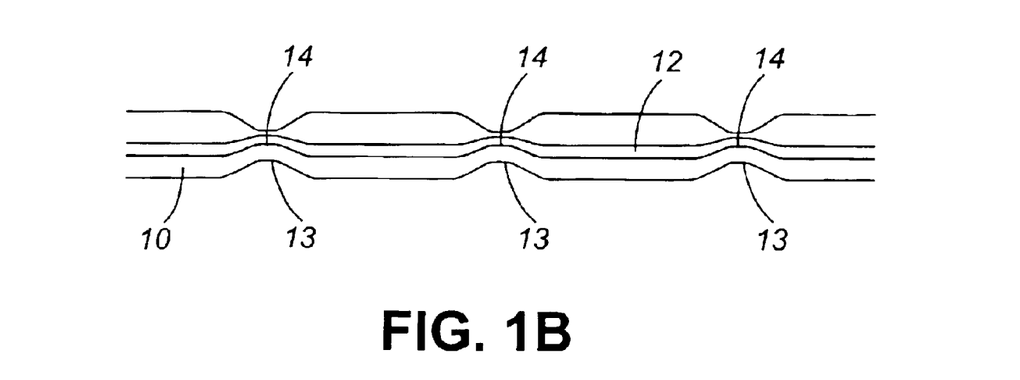
Figure 2A:
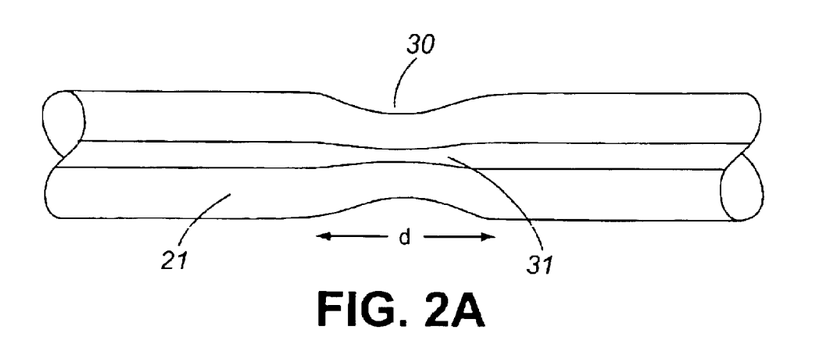
FIG. 2(a) and 2(b) depict an alternative structure for obtaining core/cladding mode coupling in a Long Period Grating.
Figure 2B:
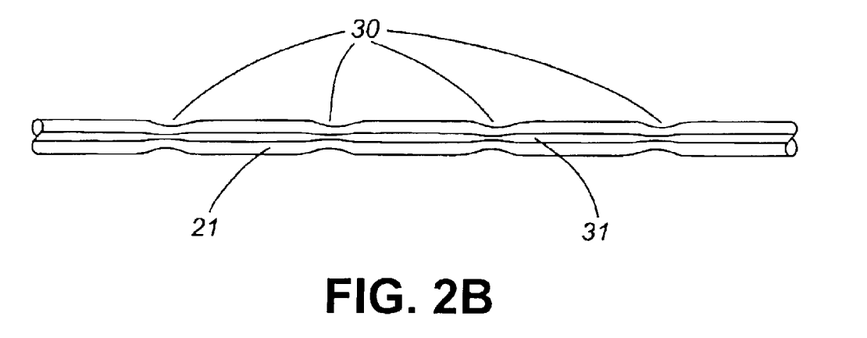

In accordance with the present invention the method will be described with respect to a Long Period Grating, as may be produced in the method disclosed in GB 2 155 621 or U.S. Pat. No. 5,708,740, as illustrated in FIG. 1a,b and FIG. 2a,b respectively. However, the inventive method of modifying the spectral performance of Long Period Grating is not limited to optical fiber waveguides, as it applies to planar waveguides, and the like so long as the core and cladding layers undergo a differential change in refractive index on exposure to ionizing radiation. Additionally, the teachings of the invention are applicable to Long Period Gratings in the which the periodic difference in index between core and cladding is written by exposing the fiber to ionizing radiation to create a periodic fluctuation for mode coupling loss to the cladding rather than back reflection loss in the core.

Referring to FIG. 1a, a pulsed focused beam of light from a carbon dioxide laser (not shown) can be employed to ablate material from the side of a length 10 of circularly symmetric optical fiber. In this way a series of notches 11 are cut into the side of the fiber at regularly spaced intervals. The notches 11 are not deep enough to reach the core 12 of the fiber 10, and so the effective refractive index of the fiber is substantially unchanged by the cutting of the notches 11. Accordingly the cutting of the notch does not of itself induce any appreciable core/cladding mode coupling. Core/cladding mode coupling is achieved by a second stage of processing, depicted in FIG. 1b that comprises locally heat softening the fiber in the vicinity of each notch in turn so that under the effects of surface tension each notch 11 is smoothed out to form a narrowed region 13 of substantially circularly symmetric profile. In the course of this smoothing-out process a wrinkle 14 is formed in the core, such that the interface between the core and cladding is not longer planar and disposed parallel to the direction of light propagation within the waveguide.

U.S. Pat. No. 5,708,740 teaches an alternative method of fabricating a long Period Grating for use as an optical notch filter, producing the structure shown in FIG. 2a and 2b. In this method a central section of the plastic protective coating, typically an acrylate coating (not shown), of single mode fiber 21 has been stripped from the fiber such that a sharply localized heat source, such as a micro burner burning a methane/oxygen mixture, provides a relatively sharply localized heat-softened zone in the bare fiber. Subsequent application of a tensile force, by moving clamps holding the ends of the fiber a controlled distance, causes a biconical neck 30 to form in the fiber by plastic flow of its glass. At the same time a similar biconical taper is formed in the core 31 of fiber 21. The forming of this biconical taper can be performed as a non-overlapping sequence of operations comprising, for example by first moving the flame into position around the fibre, next moving the clamps apart the requisite amount, and then removing the flame. The avoidance of overlapping of these operations is however not essential because the fiber is able to withstand a certain amount of tensile strain before its temperature has been raised sufficiently to cause such strain to be relieved by plastic flow, and because there will be a certain interval of time between the commencement of the removal of the flame and the lowering of the temperature of the fiber to an extent where plastic flow is no longer possible. With conventional 125 micron external diameter single mode transmission type fiber, it is found that reducing the fiber diameter down from 125 microns to about 95 microns over a total distance 'd' from one end of the biconical taper to the other of about 800 microns, provides a large enough taper angle to produce a non-adiabatic perturbation of the transmission properties of the fiber which weakly couples the zero order (core) mode and one of the higher order (cladding) modes of the fiber to provide a coupling coefficient that is small compared with 3 dB and substantially uniform over a wavelength range large compared with a few tens of nanometers.

One method of improving the thermal stability of a Long Period Grating for spectral filtering characteristics is by geometric modification of the single mode fiber. Such a Long Period Grating has the tapered perturbations described above substantially within a region of narrower diameter than the original optical fiber. The narrower diameter region is formed prior to the creation of the spaced perturbations. The single mode fiber is first pretapered to provide, between two full-sized portions of the single mode fiber, two adiabatic tapers joined by a reduced diameter portion of the single mode fiber which zero order mode power is guided substantially exclusively by the interface between the material of the fiber and the ambient surrounding the reduced diameter portion of the fiber. The spaced perturbations are then created in the reduced diameter portion.

Now, it has been discovered that when the core of such an optical fiber is photosensitive subsequent exposure to UV light, as well as other forms of ionizing radiation, results in a refractive index change that modifies the transmission function of the Long Period Grating. Surprising, the UV light exposure is significantly less than that required to "write" an index profile in a Bragg Reflection Grating. This is best understood from the standpoint that the change in refractive index between the core and cladding, $\Delta n_{c\ (irradiation)}$, on irradiation need only be comparable $(n_c-n_{cl})$, to significantly change the phase matching condition for core to cladding coupling, as the centerwavelength position of the irradiated Long Period Grating is now:

$$\lambda_{c(irradiated)}=(n_c-n_{cl}+\Delta n_{c(irradiation)})\Lambda,$$

such that the shift in center wavelength, $\Delta\lambda$ (which equals $\lambda_c-\lambda_{c(irradiated)}$) is the product of the longer periodicity, $\Lambda$, and $\Delta n_{c(irradiated)}$:

$$\lambda_c-\lambda_{c(irradiated)}=\Delta n_c\Lambda$$

Hence, a small change in core refractive index on irradiation, relative to the cladding, produces a controllable shift in the spectral transmission profile to be useful for filter tuning purposes.

The ability to tune a Long Period Grating after fabrication is especially useful in the case of long period gratings concatenated in series to form a gain flattening filters. A gain flattening filter provides spectral transmission characteristic having a wavelength dependence that is the compliment on the wavelength dependent amplification gain of an optical amplifier such that the ratio of intensity between the input signals and output signal of different wavelengths does not vary considerably. To provide a transmission profile having wavelength dependence complementary to the gain profile of the amplifier multiple discrete LPG's differing in center wavelength position and maximum attenuation are spliced together in series connection. Thus one or more of theses LPG's may be tuned according to the teachings of the invention either before or after splicing to form the GFF. Additionally, it may be desirable to create various filter profile by selectively irradiating portions of a periodic gratings to create the equivalent of multiple or concatenated filters in series, as each portion will shift in center wavelength affecting the transmission profile.

Figure 3:
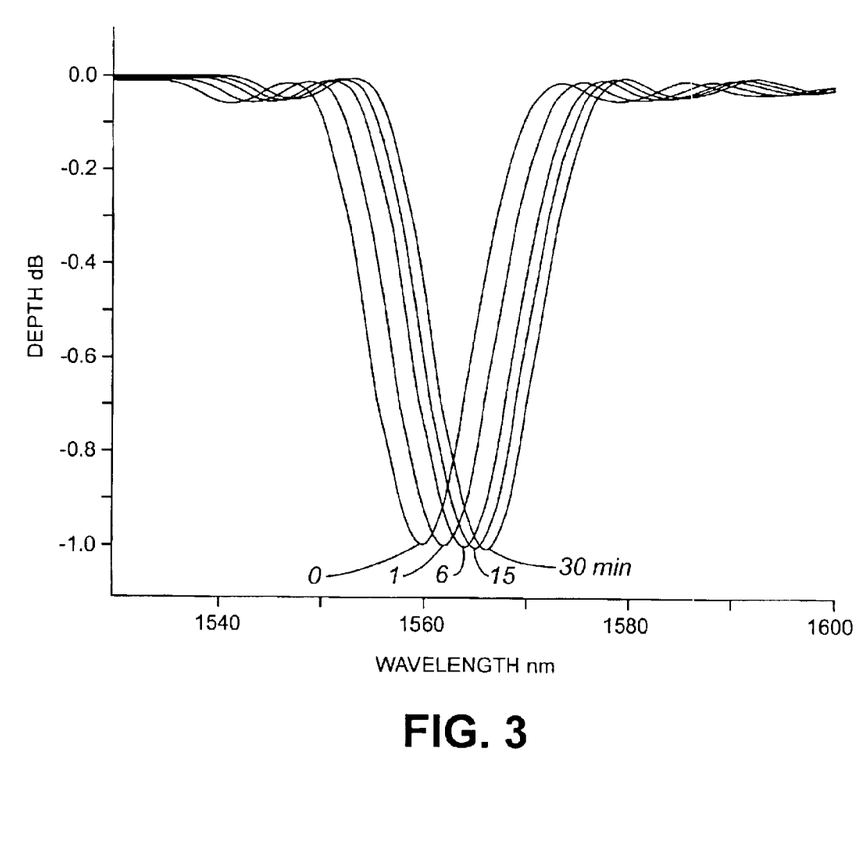
FIG. 3 depict the spectral plots of a Long Period Grating before and after a sequence of time varying exposures to UV radiation.

FIG. 3 illustrates the spectral of a Long Period Grating fabricated from a filter after UV exposure. The illustrated embodiments are of a LPG having periodic sections of equal pitch for experimental convenience, in that they provide a convenient method of characterizing the interaction of the materials and process parameters as the center wavelength position of the rejection peak (transmission minima) is a well distinguished feature related to the dose dependent changes in refractive index of the core material. However, the application of the invention is not intended to be limited to such Long Period Grating. The teachings of the invention are application to all types of filters, including gain flattening filters, band pass filters, notched filters, chirped gratings, and the like, including those taught in U.S. Pat. No. 5,764,829, which is incorporated herein by reference.

In the examples illustrated in FIG. 3 through FIG. 7 the photosensitive fibers were doped with germanium. Germanium is well known as a photosensitizer, but other fibers having a photosensitive core or cladding may be used. Although germanium, and other potential dopants, increase the refractive index of the optical medium on exposure to ionizing radiation, the invention is also applicable to core dopants or cladding layers that can be decreased in refractive index on exposure to UV light, or other forms of radiation.

Figure 7A:
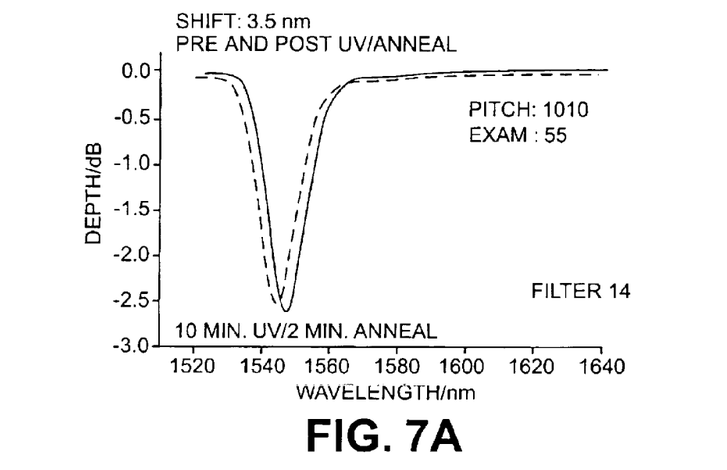
FIG. 7(a) depict the spectral plots of a Long Period Grating before treatment and after both UV exposure and annealing, while FIGS. 7(b) and 7(c) respectively illustrate the center wavelength stability of the same Long Period Gratings as a function of ambient temperature.
Figure 7B:
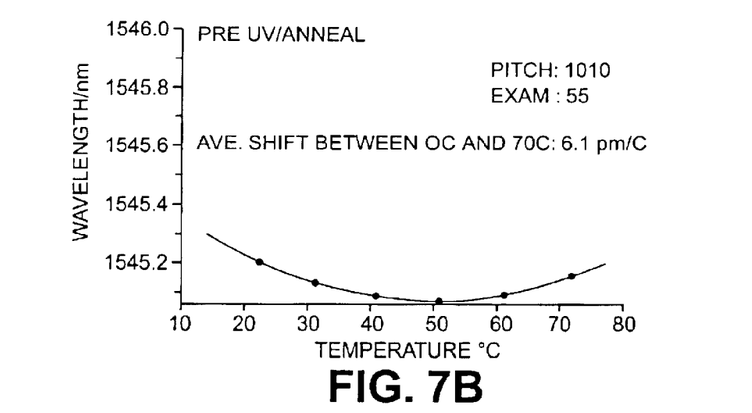
Figure 7C:
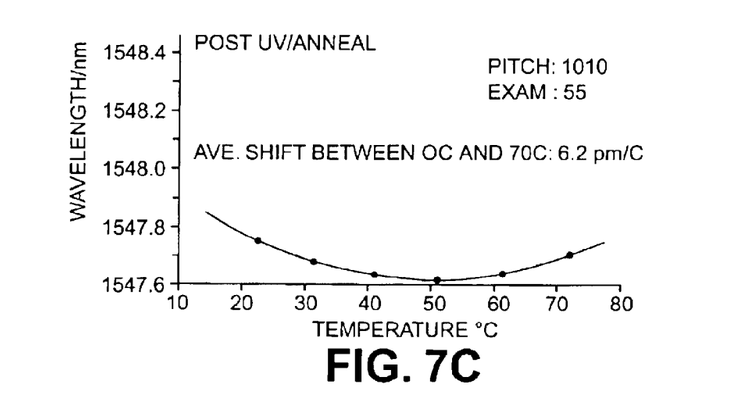

Fibers co-doped with boron and germanium, are particularly preferred as such glass composition have small thermooptical coefficients, dn/dT, that is the change in refractive index with temperature. The germanium dopant makes a positive contribution to dn/dT, which is offset by the negative contribution of co-dopant boron. Accordingly, a germanium and boron co-doped optical fiber known commercially as "GF3" (obtained from Nufern Corporation of 7 Airport Road, East Granby, Conn. 06026) was used in the examples described with reference to FIG. 7. U.S. Pat. No. 5,703,978 discloses other compositions and methods of stabilizing the refractive index of optical fibers used in Long Period Gratings.

Spectral transmission of the Long Period Gratings was measured before and after irradiation for various times with an ultraviolet source having a peak output at a wavelength of 360 nm. The source provided an incident radiation flux of about 500–600 mW/cm$^2$ Additionally, a metal mirror was positioned behind the filter during irradiation, in order to back-reflect that light onto the Long Period Grating, which would otherwise have been lost. As these conditions are comparable for those used in potting or mounting of optical fibers with ultraviolet curing compositions it may be preferable to contemporaneously complete this stage of assembly for the most critical wavelength position requirements of the optical filters, as some shift in center wavelength position has been observed with as little as 10 seconds of exposure under these conditions.

The subsequent heating of the irradiated Long Period Grating was performed using a hot air gun having its nozzle positioned between 1 and 4 cm from the optical fiber. The temperature at the gun nozzle exit was above about 200° C. Although the small mass of the optical fiber makes the measurement of its exact temperature difficult, its actual maximum temperature during the treatment is likely to be between 150 and 200° C.

In FIG. 3 the wavelength dependent transmission characteristics for Long Period Grating exposed to ultraviolet radiation for increasingly progressive times of 1, 6, 15 and 30 minutes are superimposed, and differentiated by a lead line from the center wavelength position to a numeric value of indicating the exposure time, in minutes, zero representing the unexposed condition. The center wavelength position increases progressively toward longer wavelengths, as the aforementioned exposures resulted in a shift of about 2.15, 3.91, 5.11 and 6.20 nm respectively.

Figure 4:
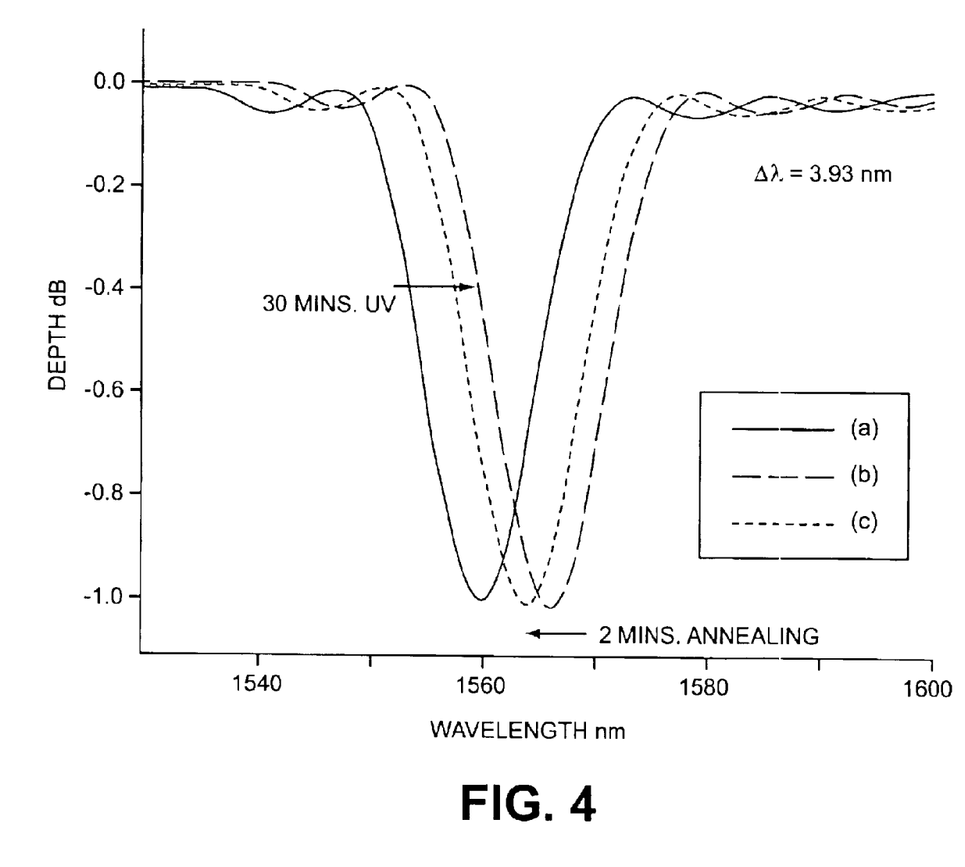
FIG. 4 depict the spectral plots of the Long Period Grating in FIG. 3 comparing the effect of subsequent annealing.

In FIG. 4 the wavelength dependent transmission characteristics for an untreated and exposed Long Period Grating (a) are compared with the same Long Period Grating after 30 minutes of ultraviolet radiation (b) and after the subsequent annealing for two minutes at a temperature estimated to be between about 150 to 200° C. (c). While the initial ultraviolet exposure has shifted the transmission curve, increasing the center wavelength position by about 3.9 nm, the subsequent annealing step reverses approximately 40% of this shift. Note that the transmission curve or profile is not distorted in shape, but rather translated laterally with respect to the wavelength axis.

As the exposure of photosensitive fiber doped with germanium with high-energy photons leads to refractive index changes, this change in refractive index appears to be basis for the shift in transmission profile. The mechanism for this change in refractive index consists of one or two photon absorption, which initiates the ionization of oxygen-deficient bonds whose absorption band is centered at 245 nm. The electrons released in this process are re-trapped at other sites. The result is an index change that remains after the illumination ceases. However, over time, these electrons nay eventually de-trap and decay back to their ground state thus leading to a bleaching of a UV written grating and a shift of the filter profile toward the original profile wavelengths.

Figure 5:
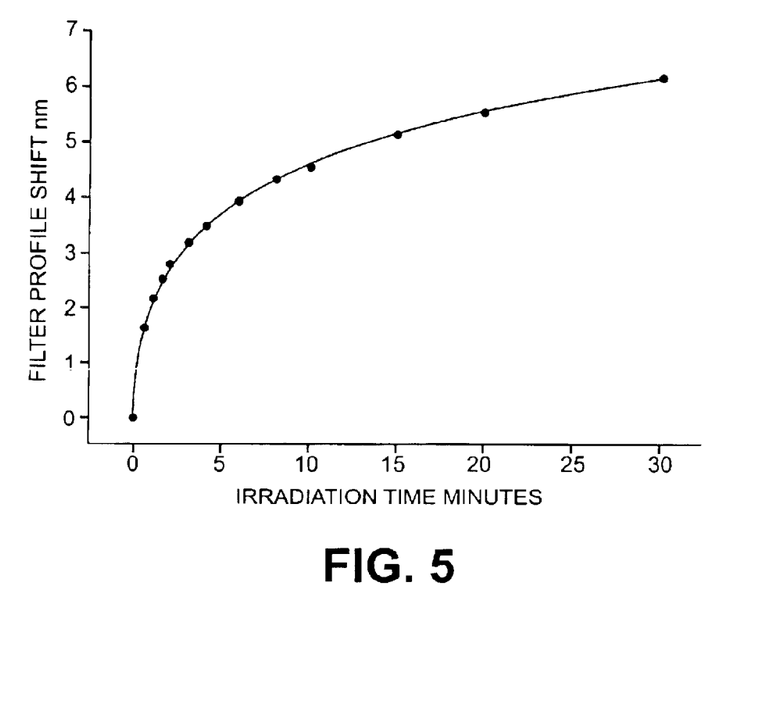
FIG. 5 illustrates the relationship between center wavelength shift in a Long Period Grating and irradiation time
Figure 6:
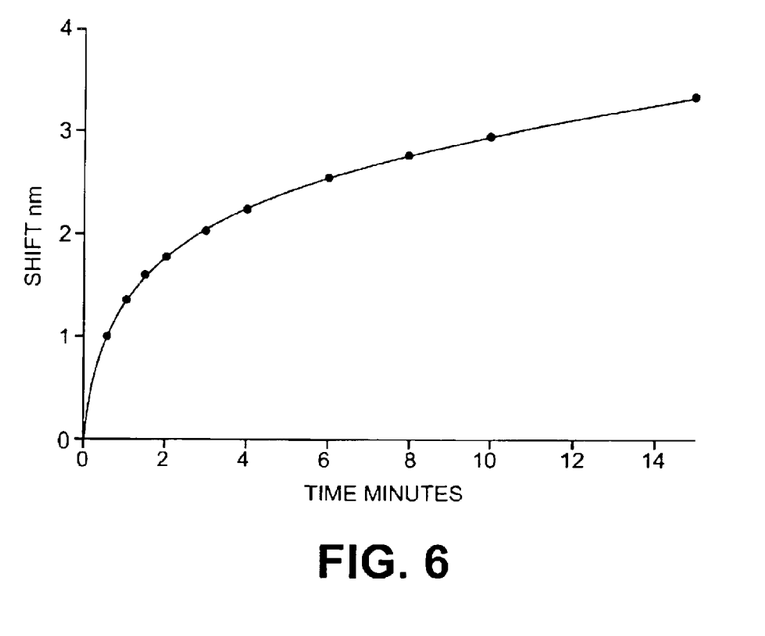
FIG. 6 illustrates the relationship between the center wavelength shift in a Long Period Grating and irradiation time after annealing for a fixed time of 2 minutes.

FIGS. 5 and 6 illustrate the irradiation dose and annealing time dependent shifts in transmission profile useful in optimizing a process to manufacture thermally stable Long Period Gratings. FIG. 5 quantifies the shift in center wavelength position to longer wavelengths by plotting the change in center wavelength position on the abscissa as a function of the irradiation time in minutes. The relationship is nonlinear, in that about half of the observed shift, about 3 nm, is obtained within less than about 5 minutes of exposure to ultraviolet radiation while additional 25 minutes are radiation is required to increase the total shift to about 6 nm. As ultraviolet light irradiation is the predominant method of manufacturing Reflection Bragg Gratings, one of ordinary skill in the art would routinely generate the data illustrated in FIG. 5 for the photosensitive waveguide material of interest.

FIG. 6 quantifies the reversal of the shift to longer wavelengths (described with respect to FIG. 5) that occurs on annealing the irradiated Long Period Grating. As in FIG. 5, the final change in center wavelength position is plotted on the ordinate as a function of the irradiation time in minutes, taking into account the reversal on annealing at 150 to 200° C. for 2 minutes. Under these conditions the final shift in wavelength is 65% of the pre-annealed shift independent of the irradiation time.

Not wishing to be bound by theory, we believe the reversal of the beneficial radiation induced shift is related to the energy levels of electrons trapped as a result of the irradiation process. As the refractive index of a photosensitive material is related to the electron energy levels. The time taken for an electron to de-trap is dependent upon the trap's activation energy or depth. The deeper the trap the longer it takes to de-trap. Thus, in order to provide a more permanent grating it is important to ensure that it is primarily "composed" of deep traps. This is achieved by heating the grating; the high-energy phonons will tend to de-trap the shallow traps thus leaving behind the longer lasting deeper traps.

Following the annealing procedure described with respect to FIG. 6, the long-term performance stability is readily determined by extrapolating the rate of center wavelength shift observed at higher annealing temperatures, as an activation energy model was found to provide an excellent fit to the experimental data. Thus, if a Long Period Grating having a difference in photosensitivity between the core and cladding exhibits a shift in spectral profile with annealing above the use temperature, this is strong indicia that it was fabricated according to the inventive process.

FIG. 7(a) compare the spectral profile of a "freshly" made Long Period Grating (dashed line) before and after treatment by the inventive method. As described with respect to FIG. 4, while post irradiation annealing, at 200° C. for 2 minutes, has shifted back the center wavelength position by approximately 30–40% of the original UV induced shift, the spectral profile is not distorted, other than a slight increase in attenuation at the center wavelength position.

FIG. 7(b) and FIG. 7(c) compare the thermal stability of the inventive Long Period Grating having the spectral transmission profiles shown in FIG. 7(a). In order to accurately characterize the effect of the treatments on spectral transmission the Long Period Gratings were positioned in a sample holder container that was in thermal contact to a hot plate. Silver foil was fixed on the ends of the sample holder to minimize heat loss bringing the filter and a temperature probe into thermal equilibrium, thus ensuring accurate measurement of Long Period Gratings actual temperature. The spectral transmission was then recorded over the indicated temperature range of 20° C. to about 70° C. in 10° C. increments. After characterizing the "freshly" made sample, illustrated as the dashed line in FIG. 7(a) to generate the data plotted in FIG. 7(b), the same filter was the irradiated with UV light for about 10 minutes, following by 2 minutes of annealing at about 200° C. Repeated spectral characterization over the same temperature range generated the data plotted in FIG. 7(c).

FIGS. 7(b) and (c) compare the center wavelength position as a function of temperature for the "freshly" made, that is conventional Long Period Grating, and tuned/shifted Long Period Grating respectively. A single figure of merit, termed the thermal dependent loss (TDL) is useful to compare the effect of these treatments. TDL was calculated by dividing the difference between the maximum center wavelength and the minimum center wavelength between 0° C. and 70° C. by 70. This average TDL shift appears be substantially unchanged by the inventive process, as the difference between 6.1 nm, before, and 6.2 nm after treatment, is largely within the limits of experimental error.

As one of the objectives of the instant invention is to obtain a Long Period Grating having highly stable optical properties within the expected range of temperature exposure, it is preferable to a) perform such annealing at a temperature considerably higher than the expected maximum use temperature, and b) for a time characterized by a relatively small dependence of shift on further annealing.

FIG. 5a illustrates in elevation a filter device 800 wherein a metal tube 850 provides the housing far packaging the inventive Long Period Grating 821. Long Period grating 821 is mounted on substrate 840 using an adhesive resin 860. An elastomeric resin 865 seals the housing by filling the space between the metal tube 850 and optical fiber pigtails 825 that enter and exit filter device 800. FIG. 8(b) is a cross section of the elevation in FIG. 8(a) taken through adhesive material 860 which forms a filet surrounding at least a lower half of optical fiber 821 in secure attachment to substrate 840. Substrate 840 is preferably a silicon wafer, or other material matched to the thermal expansion characteristics of optical fiber 821. Adhesive material 860 is preferably a UV curable resin, permitting the rapid assembly of the substrate-optical fiber combination. As adhesive material 860 is applied outside of the Long Period Grating functional regions, a mask is preferably used to protect the Long Period Grating from additional UV exposure at this stage of device fabrication.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. An optical waveguide filter made by the following steps:
    providing a first optical waveguide having:
        a core of a first optical medium extending in a direction of light propagation,
        a cladding layer of a second optical medium disposed in optical communication with said core and having a second refractive index providing a core-guided fundamental zero order mode and at least one cladding-guided higher order propagation mode within said optical waveguide,
        an alternating arrangement of regions in the direction of light propagation for coupling of power between the fundamental zero order mode in the core and at least one higher order propagation mode in the cladding,
        wherein at least one of the core and cladding optical medium is characterized by a first refractive index in an unexposed state, and a second refractive index after exposure to ionizing radiation and provide a wavelength dependent transmission profile of optical energy through said optical waveguide,
    irradiating the optical waveguide to modify the refractive index of at least one of the core or cladding optical medium causing a change of refractive index therein whereby the wavelength dependent spectral transmission profile of the filter is shifted laterally, wherein the lateral shift in spectral transmission characteristics occur without a substantial change in the shape of the transmission profile.

2. A method for forming an optical waveguide filter, the method comprising the steps of:
    providing a first optical waveguide having:
        a core of a first optical medium extending in a direction of light propagation,
        a cladding layer of a second optical medium disposed in optical communication with said core and having a second refractive index providing a core-guided fundamental zero order mode and at least one cladding-guided higher order propagation mode within said optical waveguide,
        an alternating arrangement of regions in the direction of light propagation for coupling of power between the fundamental zero order mode in the core and at least one higher order propagation mode in the cladding,
        wherein at least one of the core and cladding optical medium is characterized by a first refractive index in an unexposed state, and a second refractive index after exposure to ionizing radiation and provide a wavelength dependent transmission profile of optical energy through said optical waveguide,
    irradiating the optical waveguide to modify the refractive index of at least one of the core or cladding optical medium causing a change of refractive index therein whereby the wavelength dependent spectral transmission profile of the filter is modified, wherein the step of irradiating causes a lateral shift in the spectral transmission profile by a first value and a step of heating causes a lateral shift in the spectral transmission profile by a second value and the first and second value are of opposite sign and the second value has a smaller absolute value than the absolute value of the first value.

3. A method for forming an optical waveguide filter according to claim 2, wherein the first value is a positive number and the second value is a negative number.

4. A method for forming an optical waveguide filter, the method comprising the steps of:
    providing a first optical waveguide having:
        a core of a first optical medium extending in a direction of light propagation,
        a cladding layer of a second optical medium disposed in optical communication with said core and having a second refractive index providing a core-guided fundamental zero order mode and at least one cladding-guided higher order propagation mode within said optical waveguide,
        an alternating arrangement of regions in the direction of light propagation for coupling of power between the fundamental zero order mode in the core and at least one higher order propagation node in the cladding,
        wherein at least one of the core and cladding optical medium is characterized by a first refractive index in an unexposed state, and a second refractive index after expose to ionizing radiation and provide a wavelength dependent transmission profile of optical energy through said optical waveguide,
    irradiating the optical waveguide to modify the refractive index of at least one of the core or cladding optical medium causing a change of refractive index therein whereby the wavelength dependent spectral transmission profile of the filter is shifted laterally, wherein the lateral shift in spectral transmission characteristics occur without a substantial change in the shape of the transmission profile.

5. A method for forming an optical waveguide filter according to claim 4, the method further comprising heating the optical waveguide to a temperature sufficient to modify the wavelength dependent spectral transmission of the filter.

6. A method for forming an optical waveguide filter according to claim 4 wherein the optical waveguide is an optical fiber.

7. A method for forming an optical waveguide filter according to claim 6 wherein the step of providing the optical fiber further comprises the steps of;

forming the alternating arrangement of regions in the direction of light propagation by removing at least a portion of the cladding, and annealing the optical fiber to change the radius of curvature of at least one of the first or second interface of the cladding layer.

8. A method for forming an optical waveguide filter according to claim 6 wherein the step of providing the optical fiber further comprises the step of;

forming the alternating arrangement of regions in the direction of light propagation by axially stretching the fiber to produce plastic deformation in a heat softened zone thereof which is sufficiently sharply localized to result in the formation thereat of a non-adiabatic taper which weakly couples the zero order mode of the fiber with a higher order mode.

9. A method for forming an optical waveguide filter according to claim 8 wherein prior to the creation of the alternating arrangement of regions, the method further comprises the step of:

forming a tapered portion to provide, between two full-sized portions of a single mode fiber, two adiabatic tapers joined by a reduced diameter portion of the single mode fiber which zero order mode power is guided substantially exclusively by the interface between the material of the fiber and the ambient surrounding the reduced diameter portion of the fiber, wherein the alternating arrangement of regions are created in the reduced diameter portion.

10. A method for forming an optical waveguide filter according to claim 6 wherein the optical fiber is co-doped with boron and germanium and has a thermo-optic coefficient of less than about 10 ppm/° C. from about 20° C. to about 70° C.

* * * * *

UNITED STATES PATENT AND TRADEMARK OFFICE
CERTIFICATE OF CORRECTION

PATENT NO.     : 6,832,025 B2
DATED          : December 14, 2004
INVENTOR(S)    : Fisher et al.

Figure 8A:
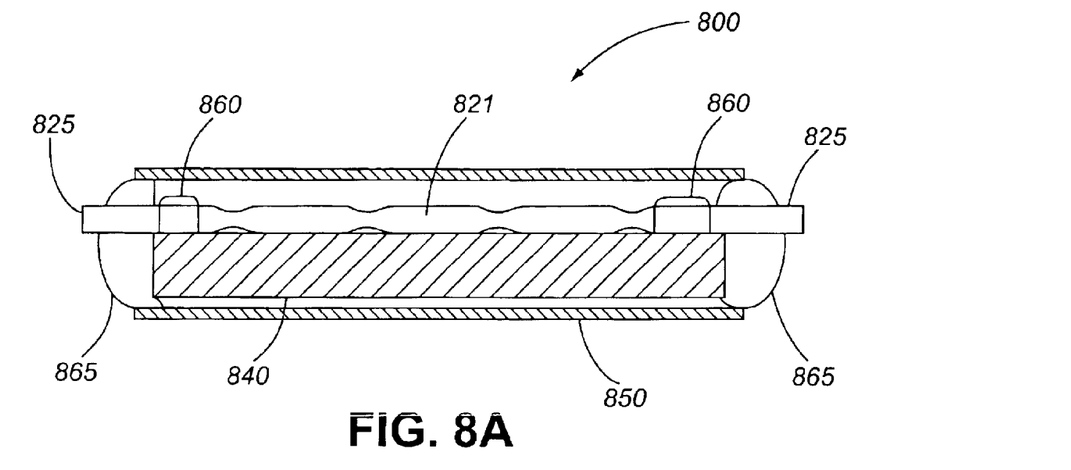
FIG. 8(a) is an elevation showing is a longitudinal cross section of an optical fiber filter device wherein the Long Period Grating formed in an optical fiber is attached to a supporting substrate and sealed in a metal tube.
Figure 8B:
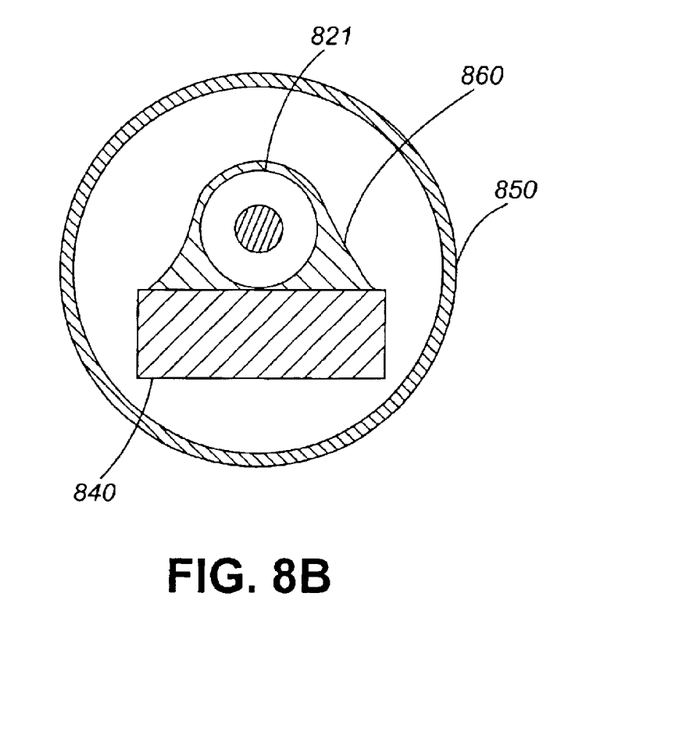
FIG. 8(b) is another cross section through the device, taken transverse to the optical fiber axis to intersect the adhesive material attaching the Long Period Grating to the supporting substrate.

It is certified that error appears in the above-identified patent and that said Letters Patent is hereby corrected as shown below:

Column 9,
Line 4, "FIG. 5a illustrates" should read -- FIG. 8a illustrates --

Signed and Sealed this

Second Day of August, 2005

JON W. DUDAS
*Director of the United States Patent and Trademark Office*